Patented Mar. 17, 1942

2,277,023

UNITED STATES PATENT OFFICE 2,277,023

COMPOSITE BEARING

Carl Steiner and Roland Sterner-Rainer, Heilbronn-on-the-Neckar, Germany, assignors to American Lurgi Corporation, New York, N. Y., a corporation of New York No Drawing. Application November 11, 1936, Serial No. 110,302. In Germany November 16, 1935

7 Claims. (Cl. 308—237)

The present invention relates to composite bearings and, particularly, to rolled composite bearings having aluminum alloy liners or bearing surfaces.

Heretofore, composite bearings of various types have been well-known. Thus poured Babbitt-lined bearings may be considered typical of one class. Various bronze alloys are representative of another class. These bearings were provided with linings or bearing surfaces which were softer than the supported shafts and were provided with shells or bases of greater structural strength than the linings. In producing these composite bearings, it was a cardinal principle that metals or alloys possessing suitable properties for a bearing surface or liner did not possess structural strength, and vice versa.

The use of aluminum and aluminum alloys of structural strength for bearings is well-known but aluminum and aluminum alloys suitable for bearing surfaces do not possess great structural strength. The art has principally used those aluminum alloys for bearings which possessed sufficient structural strength. These alloys, however, had the disadvantage of possessing considerable hardness. An example of such an alloy with high resistance to wear from friction is the well-known piston alloy containing about 13 to about 20% silicon. Such an alloy has a hardness of about 100° Brinell. For many purposes, such a degree of hardness was very undesirable. In some instances it may not only be desirable but absolutely necessary to have a relatively low hardness in order to prevent undue wearing of the shaft. Thus, the well-known lead and tin bearing-metal alloys have a hardness of about 25° to about 30° Brinell and have been very serviceable as bearing materials.

There are a number of aluminum alloys which contain no elements forming mixed crystals such as those which contain little or no copper, zinc and magnesium. The structure of these alloys is built from pure primary crystals of aluminum constituted as a matrix in which the hard crystals of the aluminum-insoluble crystals, for example, antimony, iron, nickel, manganese, titanium, cobalt and or chromium are embedded.

Many attempts have been made to produce bearings from aluminum and aluminum alloys which would combine in one structure the desirable qualities of a bearing surface with structural strength sufficient for a practical bearing. As far as we are aware, none of these attempts has met with complete success when carried into practice on an industrial scale for the production of commercially accepted products.

It is an object of the present invention to provide composite bearings with aluminum alloy liners or bearing surfaces incorporated upon a base of greater structural strength.

It is another object of the present invention to provide rolled composite bearings having aluminum alloys possessing anti-friction qualities backed by aluminum alloys possessing structural strength.

It is a further object of the present invention to provide composite bearings of substantially non-aluminous metals or alloys with bearing surfaces or liners of aluminum alloys.

The invention also contemplates the provision of composite bearings made by casting suitable aluminum bearing metal alloys within shells of greater structural strength or by welding sheets of aluminum-bearing-metal alloys by heat and pressure to bases or shells of iron or other non-aluminous metals possessing structural strength.

Other objects and advantages will become apparent from the following description of a preferred embodiment of the invention.

In general, the composite bearing produced in accordance with the present invention may be fabricated of an aluminum alloy of suitably low hardness, say below 100° Brinell, welded, or cast on an aluminum alloy base of greater structural strength than that of the alloy of low hardness or welded to a base of iron or other non-aluminous metal. This may be accomplished by super-imposing a sheet of selected character upon a block of harder aluminum alloy or other structural metal and aligning the block and sheet. After aligning the separate sheets or blocks, the juxtapositioned sheets or blocks are heated and passed between rolls or welded to form a permanent union between the sheets by forging, working or the like. The composite plates so produced can then be cut into strips or sections of desired dimensions and the composite bearings pressed from them with or without joints.

In a similar manner, exceptionally serviceable floating bearings can be made by plating the core block on opposite sides with aluminum alloy bearing-metal and subjecting the sheets or blocks to pressure after alignment and warming or heating to the proper temperature. This method of production of floating bearings has a decided advantage over the casting method. Of course, when aluminum alloy bearing-metals are welded or bonded to cores of iron or other metals or alloys with melting or softening points higher than that of the aluminum bearing-metal alloy, the preheating must be carried out at a higher temperature than when the composite bearing is made entirely from aluminum alloys. Naturally, under such conditions while the temperature of preheating must be higher, it must be below the melting point of the aluminum bearing-metal alloy.

Bearings made in accordance with the concept of the present invention in contrast with those made by pouring Babbitt metal, etc. have the advantage of a bearing surface having a higher melting point and having the capability of carrying heavier loads. In addition the bond between the inner shell or bearing surface and the outer shell of structural strength has a particular structure. The metal of the inner shell forms an autogenous union or bond with the metal of the outer shell. It is preferred to form an alloy bond at the junction of the two metals.

For the purpose of giving those skilled in the art a better understanding of the present invention, the production of a typical composite bearing will be described. For the formation of the shell or backing a block of aluminum alloy possessing the property of structural strength and a Brinell hardness of about 100° Brinell or greater, such as, for example, a Duralumin alloy of the type containing about 4 to about 5% copper, about 0.5 to about 1.5% manganese, about 0.6 to about 1.4% magnesium, about 0.3 to about 0.7% silicon, and the balance aluminum is selected and a sheet of a suitable bearing-metal aluminum alloy with a Brinell hardness of less than 100° Brinell, for example, about 20° to about 30° Brinell is superimposed upon the Duralumin block. In this operation, care should be taken to align the sheets or blocks. For the bearing-metal alloy, an aluminum alloy of the following composition has given satisfactory results.

| | | Per cent |
|---|---|---|
| Iron | approximately | 1.0 |
| Nickel | do | 1.5 |
| Manganese | do | 0.5 |
| Cobalt | do | 1.2 |
| Titanium | do | 0.3 |
| Aluminum | | Balance |

The aligned sheets or blocks are then heated, if necessary in a suitable oven or furnace to a suitable temperature and bonded or consolidated into a unitary structure by hot rolling or in general, by subjecting the sheets or blocks to pressure under the influence of heat. After the bonding operation has been completed the unitary blocks or sheets are cut into strips or bands of suitable dimensions. The composite bearings can then be pressed or stamped from these strips as needed. The bearings can be made with or without joints as desired.

For the production of the conventional type of floating bearing, a block of core metal of suitable dimensions is interposed between two sheets or blocks of aluminum bearing-metal alloy of suitable dimensions and having a suitable hardness of the order of about 20 or about 30 to about 100 or so degrees Brinell. The bonding or consolidating is carried out in the manner described hereinbefore and the unitary structures are divided into portions suitable for the production of composite bearings.

When the composite bearings are to be made with shells or backs of metal or alloys other than aluminum alloys the same procedure is followed. Of course, the preheating temperature is kept below about 630° C.

By welding, bonding, merging, fusing or consolidating is understood any method by which two or more separate sheets or blocks are formed into a unitary structure by the application of pressure at a temperature above normal room temperature and below the melting point of the metals used such as working, rolling, forging, etc.

Photomicrographs of a cross section through the joint between the outer structural shell and the inner shell or liner clearly show the particular structure of the bond between the metals. It can be quite definitely seen that the alloy of the inner shell or bearing surface has diffused into or merged or consolidated with the metal or alloy of the outer or structural shell to an appreciable depth thereby ensuring that the shells are firmly bonded to each other and a unitary structure is produced.

Although the present invention has been described in conjunction with a preferred embodiment, it is to be understood that variations and modifications may be resorted to as those skilled in the art will readily understand. Such variations and modifications are considered within the purview of the specification and the scope of the claims.

We claim:

1. A rolled composite aluminum bearing having a unitary structure comprising a shell constituted of an aluminum alloy having aluminum as the major constituent having a rolled structure of great structural strength and a hardness greater than about 100° Brinell, a liner constituted of an aluminum alloy having aluminum as a major component having a rolled structure of good bearing qualities and a hardness less than about 100° Brinell, and an autogenous bond uniting said shell with said liner to form a unitary structure.

2. A rolled composite aluminum bearing having a unitary structure comprising a liner having a rolled structure and being constituted of an aluminum alloy containing about 1.0% iron, about 1.5% nickel, about 0.5% manganese, about 1.2% cobalt, about 0.3% titanium and the balance substantially aluminum, a back having a rolled structure and being constituted of an aluminum alloy containing about 4 to about 5% copper, about 0.5 to about 1.5% manganese, about 0.6 to about 1.4% magnesium, about 0.3 to about 0.7% silicon and the balance substantially aluminum, and an autogenous bond uniting said liner with said back to form a unitary structure.

3. A composite rolled bearing having a unitary structure comprising an intermediate supporting core having a rolled structure and being constituted of a metal having structural strength, a bearing layer having a rolled structure on each side of said core and being constituted of an aluminum alloy containing about 1.0% iron, about 1.5% nickel, about 0.5% manganese, about 1.2% cobalt, about 0.3% titanium and the balance substantially aluminum, and an autogenous bond uniting said bearing layers with said intermediate supporting core to form a unitary structure.

4. A composite rolled aluminum bearing having a unitary structure comprising a shell having a rolled structure and being constituted of iron, a liner having a rolled structure and being constituted of an aluminum alloy consisting primarily of aluminum and having a hardness less than 100° Brinell and of good bearing qualities and containing small amounts of an element of the group consisting of antimony, iron, nickel, manganese, titanium, cobalt and chromium, and an autogenous bond uniting said shell with said liner to form a unitary structure.

5. A composite rolled aluminum bearing having a unitary structure produced from composite metallic sheets, said composite sheets comprising a core layer having a rolled structure and substantial structural strength, at least one liner layer constituted of an aluminum alloy consisting primarily of aluminum and having a rolled structure of good bearing qualities, and an autogenous bond obtained by working said layers at a suitable temperature below 630° C., said bond including aluminum of said liner diffused into said core layer and uniting said layers to form a unitary structure.

6. A composite rolled bearing having a unitary structure comprising a supporting core having a rolled structure and being constituted of a metal having structural strength, a bearing layer having a rolled structure on at least one side of said core and being constituted of an aluminum alloy containing about 1.0% iron, about 1.5% nickel, about 0.5% manganese, about 1.2% cobalt, about 0.3% titanium and the balance substantially aluminum, and an autogenous bond uniting said bearing layer with said supporting core to form a unitary structure.

7. A rolled composite aluminum bearing having a unitary structure comprising a metallic foundation having a rolled structure of substantial structural strength, a liner constituted of an aluminum alloy having aluminum as a major component having a rolled structure of good bearing qualities and a hardness less than about 100° Brinell, and an autogenous bond uniting said shell with said liner to form a unitary structure.

CARL STEINER.
ROLAND STERNER-RAINER.